United States Patent
Galor et al.

(10) Patent No.: US 9,218,063 B2
(45) Date of Patent: Dec. 22, 2015

(54) SESSIONLESS POINTING USER INTERFACE

(75) Inventors: Micha Galor, Tel Aviv (IL); Jonathan Pokrass, Bat-Yam (IL); Amir Hoffnung, Tel Aviv (IL); Ofir Or, Ramat Gan (IL)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 13/592,352

(22) Filed: Aug. 23, 2012

(65) Prior Publication Data

US 2013/0055120 A1  Feb. 28, 2013

Related U.S. Application Data

(60) Provisional application No. 61/526,692, filed on Aug. 24, 2011.

(51) Int. Cl.
*G06F 3/0481* (2013.01)
*G06F 3/01* (2006.01)
*G06F 3/03* (2006.01)

(52) U.S. Cl.
CPC .............. *G06F 3/017* (2013.01); *G06F 3/0304* (2013.01)

(58) Field of Classification Search
CPC .......... G06F 3/017; G06F 3/048; G06F 3/033
USPC ........ 715/764, 700; 345/173, 156; 701/23, 28
See application file for complete search history.

(56) References Cited

U.S. PATENT DOCUMENTS

| | | | |
|---|---|---|---|
| 4,550,250 A | | 10/1985 | Mueller et al. |
| 4,789,921 A | | 12/1988 | Aho |
| 4,988,981 A | | 1/1991 | Zimmerman et al. |
| 5,264,836 A | * | 11/1993 | Rubin .......................... 345/157 |
| 5,495,576 A | | 2/1996 | Ritchey |
| 5,588,139 A | | 12/1996 | Lanier et al. |
| 5,594,469 A | | 1/1997 | Freeman et al. |
| 5,846,134 A | | 12/1998 | Latypov |
| 5,852,672 A | | 12/1998 | Lu |
| 5,862,256 A | | 1/1999 | Zetts et al. |
| 5,864,635 A | | 1/1999 | Zetts et al. |
| 5,870,196 A | | 2/1999 | Lulli et al. |
| 5,917,937 A | | 6/1999 | Szeliski et al. |

(Continued)

FOREIGN PATENT DOCUMENTS

| WO | 9935633 A2 | 7/1999 |
|---|---|---|
| WO | 03071410 A2 | 8/2003 |

(Continued)

OTHER PUBLICATIONS

"Gesture-Aware Remote controls: Guidelines and Interaction Techniques", Gilles Bailly et al., 2011, Proceeding ICMI '11 Proceedings of the 13th international conference on multimodal interfaces.*

(Continued)

*Primary Examiner* — Jennifer To
*Assistant Examiner* — Jasmine Wan
(74) *Attorney, Agent, or Firm* — D. Kligler I.P. Services Ltd.

(57) ABSTRACT

A method, including receiving, by a computer, a sequence of three-dimensional maps containing at least a hand of a user of the computer, and identifying, in the maps, a device coupled to the computer. The maps are analyzed to detect a gesture performed by the user toward the device, and the device is actuated responsively to the gesture.

10 Claims, 3 Drawing Sheets

(56) References Cited

U.S. PATENT DOCUMENTS

| | | | |
|---|---|---|---|
| 5,973,700 A * | 10/1999 | Taylor et al. | 345/427 |
| 6,002,808 A | 12/1999 | Freeman | |
| 6,005,548 A | 12/1999 | Latypov et al. | |
| 6,064,387 A | 5/2000 | Canaday et al. | |
| 6,072,494 A | 6/2000 | Nguyen | |
| 6,084,979 A | 7/2000 | Kanade et al. | |
| 6,111,580 A * | 8/2000 | Kazama et al. | 715/863 |
| 6,191,773 B1 | 2/2001 | Maruno et al. | |
| 6,215,890 B1 * | 4/2001 | Matsuo et al. | 382/103 |
| 6,229,541 B1 | 5/2001 | Kamen et al. | |
| 6,243,054 B1 | 6/2001 | DeLuca | |
| 6,252,988 B1 | 6/2001 | Ho | |
| 6,256,033 B1 | 7/2001 | Nguyen | |
| 6,262,740 B1 | 7/2001 | Lauer et al. | |
| 6,345,111 B1 | 2/2002 | Yamaguchi et al. | |
| 6,345,893 B2 * | 2/2002 | Fateh et al. | 351/208 |
| 6,452,584 B1 | 9/2002 | Walker et al. | |
| 6,456,262 B1 | 9/2002 | Bell | |
| 6,507,353 B1 | 1/2003 | Huard et al. | |
| 6,512,838 B1 | 1/2003 | Rafii et al. | |
| 6,519,363 B1 | 2/2003 | Su et al. | |
| 6,559,813 B1 | 5/2003 | DeLuca et al. | |
| 6,681,031 B2 | 1/2004 | Cohen et al. | |
| 6,686,921 B1 | 2/2004 | Rushmeier | |
| 6,690,370 B2 | 2/2004 | Ellenby et al. | |
| 6,741,251 B2 | 5/2004 | Malzbender | |
| 6,791,540 B1 | 9/2004 | Baumberg | |
| 6,803,928 B2 | 10/2004 | Bimber et al. | |
| 6,853,935 B2 | 2/2005 | Satoh et al. | |
| 6,857,746 B2 | 2/2005 | Dyner | |
| 6,951,515 B2 | 10/2005 | Ohshima et al. | |
| 6,977,654 B2 | 12/2005 | Malik et al. | |
| 7,003,134 B1 | 2/2006 | Covell et al. | |
| 7,013,046 B2 | 3/2006 | Kawamura et al. | |
| 7,023,436 B2 | 4/2006 | Segawa et al. | |
| 7,042,440 B2 | 5/2006 | Pryor et al. | |
| 7,042,442 B1 | 5/2006 | Kanevsky et al. | |
| 7,151,530 B2 | 12/2006 | Roeber et al. | |
| 7,170,492 B2 | 1/2007 | Bell | |
| 7,215,815 B2 | 5/2007 | Honda | |
| 7,227,526 B2 * | 6/2007 | Hildreth et al. | 345/156 |
| 7,257,237 B1 | 8/2007 | Luck et al. | |
| 7,259,747 B2 | 8/2007 | Bell | |
| 7,264,554 B2 | 9/2007 | Bentley | |
| 7,289,227 B2 | 10/2007 | Smetak et al. | |
| 7,289,645 B2 * | 10/2007 | Yamamoto et al. | 382/104 |
| 7,295,697 B1 | 11/2007 | Satoh | |
| 7,301,648 B2 | 11/2007 | Foxlin | |
| 7,302,099 B2 | 11/2007 | Zhang et al. | |
| 7,333,113 B2 | 2/2008 | Gordon | |
| 7,340,077 B2 | 3/2008 | Gokturk | |
| 7,340,399 B2 * | 3/2008 | Friedrich et al. | 704/275 |
| 7,348,963 B2 | 3/2008 | Bell | |
| 7,358,972 B2 | 4/2008 | Gordon et al. | |
| 7,370,883 B2 | 5/2008 | Basir et al. | |
| 7,427,996 B2 | 9/2008 | Yonezawa et al. | |
| 7,428,542 B1 | 9/2008 | Fink et al. | |
| 7,474,256 B2 | 1/2009 | Ohta et al. | |
| 7,508,377 B2 | 3/2009 | Pihlaja et al. | |
| 7,526,120 B2 | 4/2009 | Gokturk et al. | |
| 7,536,032 B2 | 5/2009 | Bell | |
| 7,573,480 B2 | 8/2009 | Gordon | |
| 7,576,727 B2 | 8/2009 | Bell | |
| 7,580,572 B2 | 8/2009 | Bang et al. | |
| 7,590,941 B2 | 9/2009 | Wee et al. | |
| 7,688,998 B2 | 3/2010 | Tuma et al. | |
| 7,696,876 B2 | 4/2010 | Dimmer et al. | |
| 7,724,250 B2 | 5/2010 | Ishii et al. | |
| 7,762,665 B2 | 7/2010 | Vertegaal et al. | |
| 7,774,155 B2 | 8/2010 | Sato et al. | |
| 7,812,842 B2 | 10/2010 | Gordon | |
| 7,821,541 B2 | 10/2010 | Delean | |
| 7,834,847 B2 | 11/2010 | Boillot | |
| 7,840,031 B2 | 11/2010 | Albertson et al. | |
| 7,844,914 B2 | 11/2010 | Andre et al. | |
| 7,925,549 B2 | 4/2011 | Looney et al. | |
| 7,971,156 B2 | 6/2011 | Albertson et al. | |
| 8,018,579 B1 | 9/2011 | Krah | |
| 8,154,781 B2 | 4/2012 | Kroll et al. | |
| 8,166,421 B2 | 4/2012 | Magal et al. | |
| 8,183,977 B2 * | 5/2012 | Matsumoto | 340/5.1 |
| 8,194,921 B2 * | 6/2012 | Kongqiao et al. | 382/103 |
| 8,214,098 B2 * | 7/2012 | Murray et al. | 701/23 |
| 8,218,211 B2 | 7/2012 | Kroll et al. | |
| 8,368,647 B2 | 2/2013 | Lin | |
| 8,396,252 B2 | 3/2013 | El Dokor | |
| 8,405,604 B2 | 3/2013 | Pryor et al. | |
| 8,416,276 B2 | 4/2013 | Kroll et al. | |
| 8,446,459 B2 | 5/2013 | Fang et al. | |
| 8,448,083 B1 | 5/2013 | Migos et al. | |
| 8,462,199 B2 | 6/2013 | Givon | |
| 8,514,221 B2 | 8/2013 | King et al. | |
| 8,514,251 B2 * | 8/2013 | Hildreth et al. | 345/635 |
| 8,625,882 B2 | 1/2014 | Backlund et al. | |
| 8,996,173 B2 | 3/2015 | Itkowitz | |
| 9,030,529 B2 | 5/2015 | Chen | |
| 9,075,441 B2 | 7/2015 | St. Hilaire | |
| 9,104,271 B1 | 8/2015 | Adams | |
| 2002/0057383 A1 | 5/2002 | Iwamura | |
| 2002/0071607 A1 | 6/2002 | Kawamura et al. | |
| 2002/0158873 A1 | 10/2002 | Williamson | |
| 2003/0057972 A1 | 3/2003 | Pfaff et al. | |
| 2003/0063775 A1 | 4/2003 | Rafii et al. | |
| 2003/0088463 A1 | 5/2003 | Kanevsky | |
| 2003/0156756 A1 | 8/2003 | Gokturk et al. | |
| 2003/0185444 A1 | 10/2003 | Honda | |
| 2003/0227453 A1 | 12/2003 | Beier et al. | |
| 2003/0235341 A1 | 12/2003 | Gokturk et al. | |
| 2004/0046744 A1 | 3/2004 | Rafii et al. | |
| 2004/0104935 A1 | 6/2004 | Williamson | |
| 2004/0135744 A1 | 7/2004 | Bimber et al. | |
| 2004/0155962 A1 | 8/2004 | Marks | |
| 2004/0174770 A1 | 9/2004 | Rees | |
| 2004/0183775 A1 | 9/2004 | Bell | |
| 2004/0184640 A1 | 9/2004 | Bang et al. | |
| 2004/0184659 A1 | 9/2004 | Bang et al. | |
| 2004/0193413 A1 * | 9/2004 | Wilson et al. | 704/243 |
| 2004/0222977 A1 | 11/2004 | Bear et al. | |
| 2004/0258314 A1 | 12/2004 | Hashimoto | |
| 2005/0031166 A1 | 2/2005 | Fujimura et al. | |
| 2005/0088407 A1 | 4/2005 | Bell et al. | |
| 2005/0089194 A1 | 4/2005 | Bell | |
| 2005/0110964 A1 | 5/2005 | Bell et al. | |
| 2005/0122308 A1 | 6/2005 | Bell et al. | |
| 2005/0162381 A1 | 7/2005 | Bell et al. | |
| 2005/0190972 A1 | 9/2005 | Thomas et al. | |
| 2005/0254726 A1 | 11/2005 | Fuchs et al. | |
| 2005/0265583 A1 | 12/2005 | Covell et al. | |
| 2006/0010400 A1 | 1/2006 | Dehlin et al. | |
| 2006/0020905 A1 | 1/2006 | Wroblewski | |
| 2006/0092138 A1 | 5/2006 | Kim et al. | |
| 2006/0110008 A1 * | 5/2006 | Vertegaal et al. | 382/103 |
| 2006/0115155 A1 | 6/2006 | Lui et al. | |
| 2006/0139314 A1 | 6/2006 | Bell | |
| 2006/0149737 A1 | 7/2006 | Du et al. | |
| 2006/0159344 A1 | 7/2006 | Shao et al. | |
| 2006/0187196 A1 | 8/2006 | Underkoffler et al. | |
| 2006/0239670 A1 | 10/2006 | Cleveland | |
| 2006/0248475 A1 | 11/2006 | Abrahamsson | |
| 2007/0060336 A1 | 3/2007 | Marks et al. | |
| 2007/0078552 A1 | 4/2007 | Rosenberg | |
| 2007/0130547 A1 | 6/2007 | Boillot | |
| 2007/0154116 A1 | 7/2007 | Shieh | |
| 2007/0230789 A1 | 10/2007 | Chang et al. | |
| 2007/0285554 A1 | 12/2007 | Givon | |
| 2008/0030460 A1 | 2/2008 | Hildreth et al. | |
| 2008/0059915 A1 | 3/2008 | Boillot | |
| 2008/0062123 A1 | 3/2008 | Bell | |
| 2008/0094371 A1 | 4/2008 | Forstall et al. | |
| 2008/0123940 A1 | 5/2008 | Kundu et al. | |
| 2008/0150890 A1 | 6/2008 | Bell et al. | |
| 2008/0150913 A1 | 6/2008 | Bell et al. | |
| 2008/0170776 A1 | 7/2008 | Albertson et al. | |
| 2008/0236902 A1 | 10/2008 | Imaizumi | |

(56) References Cited

U.S. PATENT DOCUMENTS

| | | | |
|---|---|---|---|
| 2008/0252596 A1 | 10/2008 | Bell et al. | |
| 2008/0256494 A1 | 10/2008 | Greenfield | |
| 2008/0260250 A1 | 10/2008 | Vardi | |
| 2008/0281583 A1 | 11/2008 | Slothouber et al. | |
| 2008/0287189 A1 | 11/2008 | Rabin | |
| 2009/0009593 A1 | 1/2009 | Cameron et al. | |
| 2009/0027335 A1 | 1/2009 | Ye | |
| 2009/0027337 A1 | 1/2009 | Hildreth | |
| 2009/0031240 A1 | 1/2009 | Hildreth | |
| 2009/0033623 A1 | 2/2009 | Lin | |
| 2009/0040215 A1 | 2/2009 | Afzulpurkar et al. | |
| 2009/0073117 A1 | 3/2009 | Tsurumi et al. | |
| 2009/0077504 A1 | 3/2009 | Bell | |
| 2009/0078473 A1 | 3/2009 | Overgard et al. | |
| 2009/0083122 A1 | 3/2009 | Angell et al. | |
| 2009/0083622 A1 | 3/2009 | Chien et al. | |
| 2009/0096783 A1* | 4/2009 | Shpunt et al. | 345/419 |
| 2009/0183125 A1 | 7/2009 | Magal et al. | |
| 2009/0195392 A1 | 8/2009 | Zalewski | |
| 2009/0228841 A1 | 9/2009 | Hildreth | |
| 2009/0256817 A1 | 10/2009 | Perlin et al. | |
| 2009/0284542 A1* | 11/2009 | Baar et al. | 345/589 |
| 2009/0297028 A1 | 12/2009 | De Haan | |
| 2010/0002936 A1 | 1/2010 | Khomo | |
| 2010/0007717 A1 | 1/2010 | Spektor et al. | |
| 2010/0034457 A1 | 2/2010 | Berliner et al. | |
| 2010/0036717 A1 | 2/2010 | Trest | |
| 2010/0053151 A1 | 3/2010 | Marti et al. | |
| 2010/0053304 A1 | 3/2010 | Underkoffler et al. | |
| 2010/0071965 A1 | 3/2010 | Hu et al. | |
| 2010/0083189 A1* | 4/2010 | Arlein et al. | 715/863 |
| 2010/0103106 A1 | 4/2010 | Chui | |
| 2010/0149096 A1 | 6/2010 | Migos et al. | |
| 2010/0164897 A1 | 7/2010 | Morin et al. | |
| 2010/0177933 A1 | 7/2010 | Willmann et al. | |
| 2010/0199228 A1 | 8/2010 | Latta et al. | |
| 2010/0199231 A1* | 8/2010 | Markovic et al. | 715/863 |
| 2010/0229125 A1 | 9/2010 | Cha | |
| 2010/0234094 A1* | 9/2010 | Gagner et al. | 463/20 |
| 2010/0235034 A1* | 9/2010 | Higgins | 701/28 |
| 2010/0235786 A1 | 9/2010 | Meizels et al. | |
| 2010/0295781 A1 | 11/2010 | Alameh et al. | |
| 2011/0006978 A1 | 1/2011 | Yuan | |
| 2011/0007035 A1 | 1/2011 | Shai | |
| 2011/0018795 A1 | 1/2011 | Jang | |
| 2011/0029918 A1 | 2/2011 | Yoo et al. | |
| 2011/0052006 A1 | 3/2011 | Gurman et al. | |
| 2011/0081072 A1 | 4/2011 | Kawasaki et al. | |
| 2011/0087970 A1 | 4/2011 | Swink et al. | |
| 2011/0141053 A1 | 6/2011 | Bulea et al. | |
| 2011/0144543 A1* | 6/2011 | Tsuzuki et al. | 600/595 |
| 2011/0164032 A1* | 7/2011 | Shadmi | 345/419 |
| 2011/0164141 A1 | 7/2011 | Tico et al. | |
| 2011/0193939 A1 | 8/2011 | Vassigh et al. | |
| 2011/0205186 A1 | 8/2011 | Newton et al. | |
| 2011/0211754 A1 | 9/2011 | Litvak et al. | |
| 2011/0225536 A1 | 9/2011 | Shams et al. | |
| 2011/0227820 A1 | 9/2011 | Haddick et al. | |
| 2011/0231757 A1 | 9/2011 | Haddick et al. | |
| 2011/0242102 A1* | 10/2011 | Hess | 345/419 |
| 2011/0248914 A1 | 10/2011 | Sherr | |
| 2011/0254765 A1 | 10/2011 | Brand | |
| 2011/0254798 A1 | 10/2011 | Adamson et al. | |
| 2011/0260965 A1 | 10/2011 | Kim et al. | |
| 2011/0261058 A1 | 10/2011 | Luo | |
| 2011/0279397 A1 | 11/2011 | Rimon et al. | |
| 2011/0291926 A1 | 12/2011 | Gokturk et al. | |
| 2011/0292036 A1 | 12/2011 | Sali et al. | |
| 2011/0293137 A1 | 12/2011 | Gurman et al. | |
| 2011/0296353 A1* | 12/2011 | Ahmed et al. | 715/848 |
| 2011/0310010 A1 | 12/2011 | Hoffnung et al. | |
| 2012/0001875 A1 | 1/2012 | Li et al. | |
| 2012/0035934 A1 | 2/2012 | Cunningham | |
| 2012/0038550 A1* | 2/2012 | Lemmey et al. | 345/156 |
| 2012/0078614 A1 | 3/2012 | Galor et al. | |
| 2012/0117514 A1* | 5/2012 | Kim et al. | 715/849 |
| 2012/0124516 A1* | 5/2012 | Friedman | 715/810 |
| 2012/0169583 A1 | 7/2012 | Rippel et al. | |
| 2012/0173067 A1* | 7/2012 | Szczerba et al. | 701/23 |
| 2012/0200494 A1 | 8/2012 | Perski et al. | |
| 2012/0202569 A1 | 8/2012 | Maizels et al. | |
| 2012/0204133 A1 | 8/2012 | Guendelman et al. | |
| 2012/0223882 A1 | 9/2012 | Galor et al. | |
| 2012/0249416 A1* | 10/2012 | Maciocci et al. | 345/156 |
| 2012/0268369 A1* | 10/2012 | Kikkeri | 345/157 |
| 2012/0275680 A1 | 11/2012 | Omi | |
| 2012/0295661 A1 | 11/2012 | Kim et al. | |
| 2012/0309535 A1 | 12/2012 | Langridge et al. | |
| 2012/0313848 A1 | 12/2012 | Galor et al. | |
| 2012/0320080 A1 | 12/2012 | Giese et al. | |
| 2013/0002801 A1* | 1/2013 | Mock | 348/14.03 |
| 2013/0014052 A1 | 1/2013 | Frey et al. | |
| 2013/0044053 A1 | 2/2013 | Galor et al. | |
| 2013/0055120 A1 | 2/2013 | Galor et al. | |
| 2013/0055150 A1 | 2/2013 | Galor | |
| 2013/0058565 A1 | 3/2013 | Rafii et al. | |
| 2013/0106692 A1 | 5/2013 | Maizels et al. | |
| 2013/0107021 A1 | 5/2013 | Maizels et al. | |
| 2013/0155070 A1 | 6/2013 | Luo | |
| 2013/0207920 A1 | 8/2013 | McCann et al. | |
| 2014/0108930 A1 | 4/2014 | Asnis | |
| 2014/0237432 A1 | 8/2014 | Geurts et al. | |

FOREIGN PATENT DOCUMENTS

| | | | |
|---|---|---|---|
| WO | 2004107272 A1 | 12/2004 | |
| WO | 2005003948 A1 | 1/2005 | |
| WO | 2005094958 A1 | 10/2005 | |
| WO | 2007043036 A1 | 4/2007 | |
| WO | 2007078639 A1 | 7/2007 | |
| WO | 2007105205 A2 | 9/2007 | |
| WO | 2007132451 A2 | 11/2007 | |
| WO | 2007135376 A2 | 11/2007 | |
| WO | 2008120217 A2 | 10/2008 | |
| WO | 2012011044 A1 | 1/2012 | |
| WO | 2012020380 A1 | 2/2012 | |
| WO | 2012107892 A1 | 8/2012 | |

OTHER PUBLICATIONS

Miller, R., "Kinect for XBox 360 Review", Engadget, Nov. 4, 2010.

U.S. Appl. No. 13/161,508 Office Action dated Sep. 9, 2013.

International Application PCT/IB2013/052332 Search Report dated Aug. 26, 2013.

U.S. Appl. No. 13/314,210 Office Action dated Jul. 19, 2013.

U.S. Appl. No. 13/314,207 Office Action dated Aug. 5, 2013.

Hart, D., U.S. Appl. No. 09/616,606 "Method and System for High Resolution , Ultra Fast 3-D Imaging" , filed Jul. 14, 2000.

International Application PCT/IL2007/000306 Search Report dated Oct. 2, 2008.

International Application PCT/IL2007/000574 Search Report dated Sep. 10, 2008.

International Application PCT/IL2006/000335 Preliminary Report on Patentability dated Apr. 24, 2008.

Avidan et al., "Trajectory triangulation: 3D reconstruction of moving points from amonocular image sequence", IEEE Transactions on Pattern Analysis and Machine Intelligence (PAMI), vol. 22, No. 4, pp. 348-3537, Apr. 2000.

Leclerc et al., "The direct computation of height from shading", The Proceedings of the IEEE Computer Society Conference on Computer Vision and Pattern Recognition (CVPR), pp. 552-558, USA, Jun. 1991.

Zhang et al., "Shape from intensity gradient", IEEE Transactions on Systems, Man and Cybernetics—Part A: Systems and Humans, vol. 29, No. 3, pp. 318-325, May 1999.

Zhang et al., "Height recovery from intensity gradients", IEEE Computer Society Conference on Computer Vision and Pattern Recognition (CVPR), pp. 508-513, Jun. 21-23, 1994.

Horn, B., "Height and gradient from shading", International Journal of Computer Vision, vol. 5, No. 1, pp. 37-76, Aug. 1990.

(56) References Cited

OTHER PUBLICATIONS

Bruckstein, A., "On shape from shading", Computer Vision, Graphics & Image Processing, vol. 44, pp. 139-154, year 1988.
Zhang et al., "Rapid Shape Acquisition Using Color Structured Light and Multi-Pass Dynamic Programming", 1st International Symposium on 3D Data Processing Visualization and Transmission (3DPVT), Italy, Jul. 2002.
Besl, P., "Active, Optical Range Imaging Sensors", Machine vision and applications, vol. 1, pp. 127-152, year 1988.
Horn et al., "Toward optimal structured light patterns", Proceedings of International Conference on Recent Advances in 3D Digital Imaging and Modeling, pp. 28-37, Ottawa, Canada, May 1997.
Goodman, J.W., "Statistical Properties of Laser Speckle Patterns", Laser Speckle and Related Phenomena, pp. 9-75, Springer-Verlag, Berlin Heidelberg, 1975.
Asada et al., "Determining Surface Orientation by Projecting a Stripe Pattern", IEEE Transactions on Pattern Analysis and Machine Intelligence (PAMI), vol. 10, No. 5, pp. 749-754, Sep. 1988.
Winkelbach et al., "Shape from Single Stripe Pattern Illumination", Luc Van Gool (Editor), (DAGM 2002), Lecture Notes in Computer Science 2449, p. 240-247, Springer 2002.
Koninckx et al., "Efficient, Active 3D Acquisition, based on a Pattern-Specific Snake", Luc Van Gool (Editor), (DAGM 2002), Lecture Notes in Computer Science 2449, pp. 557-565, Springer 2002.
Kimmel et al., "Analyzing and synthesizing images by evolving curves with the Osher-Sethian method", International Journal of Computer Vision, vol. 24, No. 1, pp. 37-56, year 1997.
Zigelman et al., "Texture mapping using surface flattening via multi-dimensional scaling", IEEE Transactions on Visualization and Computer Graphics, vol. 8, No. 2, pp. 198-207, Apr. 2002.
Dainty, J.C., "Introduction", Laser Speckle and Related Phenomena, pp. 1-7, Springer-Verlag, Berlin Heidelberg, 1975.
Mendlovic et al., "Composite harmonic filters for scale, projection and shift invariant pattern recognition", Applied Optics Journal, vol. 34, No. 2, Jan. 10, 1995.
Fua et al., "Human Shape and Motion Recovery Using Animation Models", 19th Congress, International Society for Photogrammetry and Remote Sensing, Amsterdam, The Netherlands, Jul. 2000.
Allard et al., "Marker-less Real Time 3D modeling for Virtual Reality", Immersive Projection Technology, Iowa State University, year 2004.
Howe et al., "Bayesian Reconstruction of 3D Human Motion from Single-Camera Video", Advanced in Neural Information Processing Systems, vol. 12, pp. 820-826, USA 1999.
Li et al., "Real-Time 3D Motion Tracking with Known Geometric Models", Real-Time Imaging Journal, vol. 5, pp. 167-187, Academic Press 1999.
Grammalidis et al., "3-D Human Body Tracking from Depth Images Using Analysis by Synthesis", Proceedings of the IEEE International Conference on Image Processing (ICIP2001), pp. 185-188, Greece, Oct. 7-10, 2001.
Segen et al., "Shadow gestures: 3D hand pose estimation using a single camera", Proceedings of IEEE International Conference on Computer Vision and Pattern Recognition, pp. 479-485, Fort Collins, USA, 1999.
Vogler et al., "ASL recognition based on a coupling between HMMs and 3D motion analysis", Proceedings of IEEE International Conference on Computer Vision, pp. 363-369, Mumbai, India, 1998.
Nam et al., "Recognition of Hand Gestures with 3D, Nonlinear Arm Movements", Pattern Recognition Letters, vol. 18, No. 1, pp. 105-113, Elsevier Science B.V. 1997.
Nesbat, S., "A System for Fast, Full-Text Entry for Small Electronic Devices", Proceedings of the 5th International Conference on Multimodal Interfaces, ICMI 2003, Vancouver, Nov. 5-7, 2003.
Ascension Technology Corporation, "Flock of Birds: Real-Time Motion Tracking", 2008.
Segen et al., "Human-computer interaction using gesture recognition and 3D hand tracking", ICIP 98, Proceedings of the IEEE International Conference on Image Processing, vol. 3, pp. 188-192, Oct. 4-7, 1998.
Dekker, L., "Building Symbolic Information for 3D Human Body Modeling from Range Data", Proceedings of the Second International Conference on 3D Digital Imaging and Modeling, IEEE computer Society, pp. 388-397, 1999.
Holte et al., "Gesture Recognition using a Range Camera", Technical Report CVMT-07-01 ISSN 1601-3646, Feb. 2007.
Cheng et al., "Articulated Human Body Pose Inference from Voxel Data Using a Kinematically Constrained Gaussian Mixture Model", CVPR EHuM2: 2nd Workshop on Evaluation of Articulated Human Motion and Pose Estimation, 2007.
Microvision Inc., "PicoP® Display Engine—How it Works", 1996-2012.
Primesense Corporation, "PrimeSensor NITE 1.1", USA, year 2010.
Arm Ltd., "AMBA Specification: AHB", Version 2, pp. 35-92, year 1999.
Commission Regulation (EC) No. 1275/2008, Official Journal of the European Union, Dec. 17, 2008.
Primesense, "Natural Interaction", YouTube Presentation, Jun. 9, 2010 http://www.youtube.com/watch?v=TzLKsex43zl~.
Manning et al., "Foundations of Statistical Natural Language Processing", chapters 6,7,9 and 12, MIT Press 1999.
U.S. Appl. No. 12/762,336 Official Action dated May 15, 2012.
Tobii Technology, "The World Leader in Eye Tracking and Gaze Interaction", Mar. 2012.
Noveron, "Madison video eyewear", year 2012.
International Application PCT/IB2012/050577 Search Report dated Aug. 6, 2012.
U.S. Appl. No. 12/683,452 Official Action dated Sep. 7, 2012.
Koutek, M., "Scientific Visualization in Virtual Reality: Interaction Techniques and Application Development", PhD Thesis, Delft University of Technology, 264 pages, Jan. 2003.
Azuma et al., "Recent Advances in Augmented Reality", IEEE Computer Graphics and Applications, vol. 21, issue 6, pp. 34-47, Nov. 2001.
Breen et al., "Interactive Occlusion and Collision of Real and Virtual Objects in Augmented Reality", Technical Report ECRC-95-02, ECRC, Munich, Germany, 22 pages, year 1995.
Burdea et al., "A Distributed Virtual Environment with Dextrous Force Feedback", Proceedings of Interface to Real and Virtual Worlds Conference, pp. 255-265, Mar. 1992.
Bleiwess et al., "Fusing Time-of-Flight Depth and Color for Real-Time Segmentation and Tracking", Dyn3D 2009, Lecture Notes in Computer Science 5742, pp. 58-69, Jena, Germany, Sep. 9, 2009.
Bleiwess et al., "Markerless Motion Capture Using a Single Depth Sensor", SIGGRAPH Asia 2009, Yokohama, Japan, Dec. 16-19, 2009.
Bevilacqua et al., "People Tracking Using a Time-Of-Flight Depth Sensor", Proceedings of the IEEE International Conference on Video and Signal Based Surveillance, Sydney, Australia, Nov. 22-24, 2006.
Bradski, G., "Computer Vision Face Tracking for Use in a Perceptual User Interface", Intel Technology Journal, vol. 2, issue 2 (2nd Quarter 2008).
Comaniciu et al., "Kernel-Based Object Tracking", IEEE Transactions on Pattern Analysis and Machine Intelligence, vol. 25, No. 5, pp. 564-577, May 2003.
Gesturetec Inc., "Gesture Control Solutions for Consumer Devices", Canada, 2009.
Gokturk et al., "A Time-Of-Flight Depth Sensor—System Description, Issues and Solutions", Proceedings of the 2004 Conference on Computer Vision and Patter Recognition Workshop (CVPRW'04), vol. 3, pp. 35, Jun. 27-Jul. 2, 2004.
Grest et al., "Single View Motion Tracking by Depth and Silhouette Information", SCIA 2007—Scandinavian Conference on Image Analysis, Lecture Notes in Computer Science 4522, pp. 719-729, Aalborg, Denmark, Jun. 10-14, 2007.
Haritaoglu et al., "Ghost 3d: Detecting Body Posture and Parts Using Stereo", Proceedings of the IEEE Workshop on Motion and Video Computing (Motion'02), pp. 175-180, Orlando, USA, Dec. 5-6, 2002.
Haritaoglu et al., "W4S : A real-time system for detecting and tracking people in 2<1/2>D", ECCV 98—5th European conference on computer vision, vol. 1407, pp. 877-892, Freiburg , Germany, Jun. 2-6, 1998.

(56) References Cited

OTHER PUBLICATIONS

Harville, M., "Stereo Person Tracking with Short and Long Term Plan-View Appearance Models of Shape and Color", Proceedings of the IEEE International Conference on Advanced Video and Signal-Based Surveillance (AVSSS-2005), pp. 522-527, Como, Italy, Sep. 15-16, 2005.
Holte, M., "Fusion of Range and Intensity Information for View Invariant Gesture Recognition", IEEE Conference on Computer Vision and Pattern Recognition Workshops (CVPRW '08), pp. 1-7, Anchorage, USA, Jun. 23-28, 2008.
Kaewtrakulpong et al., "An Improved Adaptive Background Mixture Model for Real-Time Tracking with Shadow Detection", Proceedings of the 2nd European Workshop on Advanced Video Based Surveillance Systems (AVBS'01), Kingston, UK, Sep. 2001.
Kolb et al., "ToF-Sensors: New Dimensions for Realism and Interactivity", Proceedings of the IEEE Conference on Computer Vision and Patter Recognition Workshops, pp. 1-6, Anchorage, USA, Jun. 23-28, 2008.
Kolsch et al., "Fast 2D Hand Tracking with Flocks of Features and Multi-Cue Integration", IEEE Workshop on Real-Time Time Vision for Human Computer Interaction (at CVPR'04), Washington, USA, Jun. 27-Jul. 2, 2004.
Krumm et al., "Multi-Camera Multi-Person Tracking for EasyLiving", 3rd IEEE International Workshop on Visual Surveillance, Dublin, Ireland, Jul. 1, 2000.
Leens et al., "Combining Color, Depth, and Motion for Video Segmentation", ICVS 2009—7th International Conference on Computer Vision Systems, Liege, Belgium Oct. 13-15, 2009.
MacCormick et al., "Partitioned Sampling, Articulated Objects, and Interface-Quality Hand Tracking", ECCV '00—Proceedings of the 6th European Conference on Computer Vision—Part II , pp. 3-19, Dublin, Ireland, Jun. 26-Jul. 1, 2000.
Malassiotis et al., "Real-Time Hand Posture Recognition Using Range Data", Image and Vision Computing, vol. 26, No. 7, pp. 1027-1037, Jul. 2, 2008.
Morano et al., "Structured Light Using Pseudorandom Codes", IEEE Transactions on Pattern Analysis and Machine Intelligence, vol. 20, issue 3, pp. 322-327, Mar. 1998.
Munoz-Salinas et al., "People Detection and Tracking Using Stereo Vision and Color", Image and Vision Computing, vol. 25, No. 6, pp. 995-1007, Jun. 1, 2007.
Nanda et al., "Visual Tracking Using Depth Data", Proceedings of the 2004 Conference on Computer Vision and Patter Recognition Workshop, vol. 3, Washington, USA Jun. 27-Jul. 2, 2004.
Scharstein et al., "High-Accuracy Stereo Depth Maps Using Structured Light", IEEE Conference on Computer Vision and Patter Recognition, vol. 1, pp. 195-2002, Madison, USA, Jun. 2003.
Shi et al., "Good Features to Track", IEEE Conference on Computer Vision and Pattern Recognition, pp. 593-600, Seattle, USA, Jun. 21-23, 1994.
Siddiqui et al., "Robust Real-Time Upper Body Limb Detection and Tracking", Proceedings of the 4th ACM International Workshop on Video Surveillance and Sensor Networks, Santa Barbara, USA, Oct. 27, 2006.
Softkinetic S.A., IISU™—3D Gesture Recognition Platform for Developers of 3D Applications, Belgium, Brussels, 2007 - 2010.
Sudderth et al., "Visual Hand Tracking Using Nonparametric Belief Propagation", IEEE Workshop on Generative Model Based Vision at CVPR'04, Washington, USA, Jun. 27-Jul. 2, 2004.
Tsap, L. "Gesture-Tracking in Real Time with Dynamic Regional Range Computation", Real-Time Imaging, vol. 8, issue 2, pp. 115-126, Apr. 2002.
Xu et al., "A Multi-Cue-Based Human Body Tracking System", Proceedings of the 5ths International Conference on Computer Vision Systems (ICVS 2007), Germany, Mar. 21-24, 2007.
Xu et al., "Human Detecting Using Depth and Gray Images", Proceedings of the IEE Conference on Advanced Video and Signal Based Surveillance (AVSS'03), Miami, USA, Jul. 21-22, 2003.
Yilmaz et al., "Object Tracking: A Survey", ACM Computing Surveys, vol. 38, No. 4, article 13, Dec. 2006.
Zhu et al., "Controlled Human Pose Estimation From Depth Image Streams", IEEE Conference on Computer Vision and Patter Recognition Workshops, pp. 1-8, Anchorage, USA, Jun. 23-27, 2008.
International Application PCT/IB2010/051055 Search Report dated Sep. 1, 2010.
La Viola, J. Jr., "Whole-Hand and Speech Input in Virtual Environments", Computer Science Department, Florida Atlantic University, USA, 1996.
Martell, C., "Form: An Experiment in the Annotation of the Kinematics of Gesture", Dissertation, Computer and Information Science, University of Pennsylvania, 2005.
U.S. Appl. No. 12/352,622 Official Action dated Mar. 31, 2011.
Prime Sense Inc., "Prime Sensor™ NITE 1.1 Framework Programmer's Guide", Version 1.2, year 2009.
Primesense Corporation, "PrimeSensor Reference Design 1.08", USA, year 2010.
U.S. Appl. No. 13/584,831, filed Aug. 14, 2012.
U.S. Appl. No. 61/615,403, filed Mar. 26, 2012.
U.S. Appl. No. 61/603,949, filed Feb. 28, 2012.
U.S. Appl. No. 61/525,771, filed Aug. 21, 2011.
U.S. Appl. No. 61/663,638, filed Jun. 25, 2012.
U.S. Appl. No. 61/538,970, filed Sep. 26, 2011.
U.S. Appl. No. 13/592,369, filed Aug. 23, 2012.
International Application PCT/IB2011/053192 Search Report dated Dec. 6, 2011.
U.S. Appl. No. 13/314,210, filed Dec. 8, 2011.
U.S. Appl. No. 12/352,622 Official Action dated Sep. 30, 2011.
U.S. Appl. No. 13/244,490 Office Action dated Dec. 6, 2013.
U.S. Appl. No. 13/423,314 Office Action dated Dec. 4, 2013.
U.S. Appl. No. 13/423,322 Office Action dated Nov. 1, 2013.
Gordon et al., "The use of Dense Stereo Range Date in Augmented Reality", Proceedings of the 1st International Symposium on Mixed and Augmented Reality (ISMAR), Darmstadt, Germany, pp. 1-10, Sep. 30-Oct. 1, 2002.
Agrawala et al., "The two-user Responsive Workbench :support for collaboration through individual views of a shared space", Proceedings on the 24th conference on computer graphics and interactive techniques (SIGGRAPH 97), Los Angeles, USA, pp. 327-332 , Aug. 3-8, 1997.
Harman et al., "Rapid 2D-to 3D conversion", Proceedings of SPIE Conference on Stereoscopic Displays and Virtual Reality Systems, vol. 4660, pp. 78-86, Jan. 21-23, 2002.
Hoff et al., "Analysis of head pose accuracy in augmented reality", IEEE Transactions on Visualization and Computer Graphics, vol. 6, No. 4, pp. 319-334, Oct.-Dec. 2000.
Poupyrev et al., "The go-go interaction technique: non-liner mapping for direct manipulation in VR", Proceedings of the 9th annual ACM Symposium on User interface software and technology (UIST '96), Washington, USA, pp. 79-80, Nov. 6-8, 1996.
Wexelblat et al., "Virtual Reality Applications and Explorations", Academic Press Inc., San Diego, USA, 262 pages, year 1993.
U.S. Appl. No. 13/161,508 Office Action dated Apr. 10, 2013.
U.S. Appl. No. 12/683,452 Office Action dated Jun. 7, 2013.
Galor, M., U.S. Appl. No. 13/778,172 "Asymmetric Mapping in Tactile and Non-Tactile User Interfaces", filed Feb. 27, 2013.
Berenson et al., U.S. Appl. No. 13/904,050 "Zoom-based gesture user interface", filed May 29, 2013.
Berenson et al., U.S. Appl. No. 13/904,052 "Gesture-based interface with enhanced features", filed May 29, 2013.
Bychkov et al., U.S. Appl. No. 13/849,514 "Gaze-enhanced Virtual Touchscreen", filed Mar. 24, 2013.
Guendelman et al., U.S. Appl. No. 13/849,514 "Enhanced Virtual Touchpad", filed Mar. 24, 2013.
Sun et al., "SRP Based Natural Interaction Between Real and Virtual Worlds in Augmented Reality", Proceedings of the International Conference on Cyberworlds (CW'08), pp. 117-124, Sep. 22-24, 2008.
Schmalstieg et al., "The Studierstube Augmented Reality Project", Presence: Teleoperators and Virtual Environments, vol. 11, No. 1, pp. 33-54, Feb. 2002.
Ohta et al., "Share-Z: Client/Server Depth Sensing for See-Through Head-Mounted Displays", Presence: Teleoperators and Virtual Environments, vol. 11, No. 2, pp. 176-188, Apr. 2002.

(56) References Cited

OTHER PUBLICATIONS

Gobbetti et al., "VB2: an Architecture for Interaction in Synthetic Worlds", Proceedings of the 6th Annual ACM Symposium on User Interface Software and Technology (UIST'93), pp. 167-178, Nov. 3-5, 1993.
Gargallo et al., "Bayesian 3D Modeling from Images Using Multiple Depth Maps", Proceedings of the IEEE Computer Society Conference on Computer Vision and Pattern Recognition (CVPR'05), vol. 2, pp. 885-891, Jun. 20-25, 2005.
U.S. Appl. No. 13/541,786, filed Jul. 5, 2012.
U.S. Appl. No. 61/652,899, filed May 30, 2012.
U.S. Appl. No. 13/541,786 Office Action dated Feb. 13, 2014.
U.S. Appl. No. 13/584,831 Office Action dated Mar. 20, 2014.
U.S. Appl. No. 13/314,207 Office Action dated Apr. 3, 2014.
U.S. Appl. No. 12/683,452 Office Action dated Jan. 22, 2014.
U.S. Appl. No. 12/314,210 Office Action dated Jan. 10, 2014.
U.S. Appl. No. 13/423,322 Office Action dated Apr. 7, 2014.
Nakamura et al, "Occlusion detectable stereo-occlusion patterns in camera matrix", Proceedings of the 1996 Conference on Computer Vision and Pattern Recognition (CVPR '96), pp. 371-378, Jun. 1996.
U.S. Appl. No. 14/055,997 Office Action dated May 28, 2014.
U.S. Appl. No. 12/721,582 Office Action dated Apr. 17, 2014.
U.S. Appl. No. 13/584,831 Office Action dated Jul. 8, 2014.
U.S. Appl. No. 13/423,314 Office Action dated Jul. 31, 2014.
U.S. Appl. No. 12/683,452 Office Action dated Jul. 16, 2014.
U.S. Appl. No. 13/423,314 Advisory Action dated Jun. 26, 2014.
Slinger et al, "Computer—Generated Holography as a Generic Display Technology", IEEE Computer, vol. 28, Issue 8, pp. 46-53, Aug. 2005.
Hilliges et al, "Interactions in the air: adding further depth to interactive tabletops", Proceedings of the 22nd annual ACM symposium on User interface software and technology, ACM, pp. 139-148, Oct. 2009.
U.S. Appl. No. 12/683,452 Office Action dated Nov. 21, 2014.
U.S. Appl. No. 14/055,997 Office Action dated Nov. 21, 2014.
Kauff et al., "Depth map creation and image-based rendering for advanced 3DTV Services Providing Interoperability and Scalability", Signal Processing: Image Communication, vol. 22, No. 2, pp. 217-234, year 2007.
Scharstein, D., "Stereo vision for view synthesis", Proceedings of IEEE Conference on Computer Vision and Pattern Recognition, pp. 852-858, year 1996.
Zhu et al., "Generation and Error Characterization of Pararell-Perspective Stereo Mosaics from Real Video", In-Video Registration, Springer, US, chapter 4,pp. 72-105, year 2003.
Chai et al., "Parallel Projections for Stereo Reconstruction", Proceedings of IEEE Conference on Computer Vision and Pattern Recognition ,vol. 2, pp. 493-500, year 2000.
Evers et al., "Image-based rendering of complex scenes from multi-camera rig", IEEE Proceedings on Vision, Image and Signal Processing, vol. 152, No. 4, pp. 470-480, Aug. 5, 2005.
Evers et al,. "Image-based Interactive rendering with view dependent geometry", Computer Graphics Forum, (Eurographics '03), vol. 22, No. 3, pp. 573-582, year 2003.
U.S. Appl. No. 13/161,508 Office Action dated Dec. 23, 2014.
U.S. Appl. No. 13/161,508 Office Action dated Aug. 18, 2015.
U.S. Appl. No. 13/904,052 Office Action dated Oct. 14, 2015.

\* cited by examiner

SESSIONLESS POINTING USER INTERFACE

CROSS-REFERENCE TO RELATED APPLICATIONS

This application claims the benefit of U.S. Provisional Patent Application 61/526,692 filed on Aug. 24, 2011, which is incorporated herein by reference.

FIELD OF THE INVENTION

This invention relates generally to user interfaces for computerized systems, and specifically to user interfaces that are based on three-dimensional sensing.

BACKGROUND OF THE INVENTION

Many different types of user interface devices and methods are currently available. Common tactile interface devices include the computer keyboard, mouse and joystick. Touch screens detect the presence and location of a touch by a finger or other object within the display area. Infrared remote controls are widely used, and "wearable" hardware devices have been developed, as well, for purposes of remote control.

Computer interfaces based on three-dimensional (3D) sensing of parts of the user's body have also been proposed. For example, PCT International Publication WO 03/071410, whose disclosure is incorporated herein by reference, describes a gesture recognition system using depth-perceptive sensors. A 3D sensor provides position information, which is used to identify gestures created by a body part of interest. The gestures are recognized based on a shape of a body part and its position and orientation over an interval. The gesture is classified for determining an input into a related electronic device.

As another example, U.S. Pat. No. 7,348,963, whose disclosure is incorporated herein by reference, describes an interactive video display system, in which a display screen displays a visual image, and a camera captures 3D information regarding an object in an interactive area located in front of the display screen. A computer system directs the display screen to change the visual image in response to changes in the object.

Three-dimensional human interface systems may identify not only the user's hands, but also other parts of the body, including the head, torso and limbs. For example, U.S. Patent Application Publication 2010/0034457, whose disclosure is incorporated herein by reference, describes a method for modeling humanoid forms from depth maps. The depth map is segmented so as to find a contour of the body. The contour is processed in order to identify a torso and one or more limbs of the subject. An input is generated to control an application program running on a computer by analyzing a disposition of at least one of the identified limbs in the depth map.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention a method including receiving, by a computer, a sequence of three-dimensional maps containing at least a hand of a user of the computer, identifying, in the maps, a device coupled to the computer, analyzing the maps to detect a gesture performed by the user toward the device, and actuating the device responsively to the gesture.

There is also provided, in accordance with an embodiment of the present invention an apparatus including a three-dimensional sensing device, and a computer configured to receive from the three-dimensional sensing device a sequence of three-dimensional maps containing at least a hand of a user of the computer, to identify, in the maps, an entity coupled to the computer, to analyze the maps to detect a gesture performed by the user toward the entity, and to actuate the entity responsively to the gesture.

There is additionally provided, in accordance with an embodiment of the present invention a computer software product including a non-transitory computer-readable medium, in which program instructions are stored, which instructions, when read by a computer, cause the computer to receive a sequence of three-dimensional maps containing at least a hand of a user of the computer, to identify, in the maps, a device coupled to the computer, to analyze the maps to detect a gesture performed by the user toward the device, and to actuate the device responsively to the gesture.

BRIEF DESCRIPTION OF THE DRAWINGS

The disclosure is herein described, by way of example only, with reference to the accompanying drawings, wherein.

DETAILED DESCRIPTION OF EMBODIMENTS

When using a tactile input device such as a mouse, the user typically manipulates the physical device in a two-dimensional plane comprising a horizontal X-axis and a vertical Y-axis. However, when interacting with a non-tactile three-dimensional (3D) user interface (also referred to herein as a 3D user interface), the user may perform gestures in mid-air, and perform the gestures from different positions within a field of view of a 3D sensor coupled to the interface.

U.S. patent application Ser. No. 13/314,210, filed on Dec. 8, 2011, whose disclosure is incorporated herein by reference, describes focus gestures that enable a user to activate a 3D user interface and unlock gestures that enable the user to engage a locked 3D user interface. However, in instances where a user's interaction with a device controlled by a 3D user interface is very brief, requiring the user to initiate a session (with the device) by performing a focus gesture followed by an unlock gesture can be cumbersome.

Embodiments of the present invention provide methods and systems for a user to actuate a device (e.g., a television or a lighting fixture) via gestures described hereinbelow. In some embodiments the device is driven by a computer executing a sessionless pointing user interface (SPUI) that enables sessionless control of the device, i.e., wherein no session is initiated by the user. For example, the user can turn on a light by pointing at the light.

Additionally or alternatively, the computer can be configured to reduce false positives (i.e., the user may point at the light inadvertently during a conversation) by actuating the device in response to a gesture and a vocal command. For example, the computer can turn on the light in response to the user saying "Light" while pointing at the light.

DETAILED DESCRIPTION OF EMBODIMENTS

Figure 1:
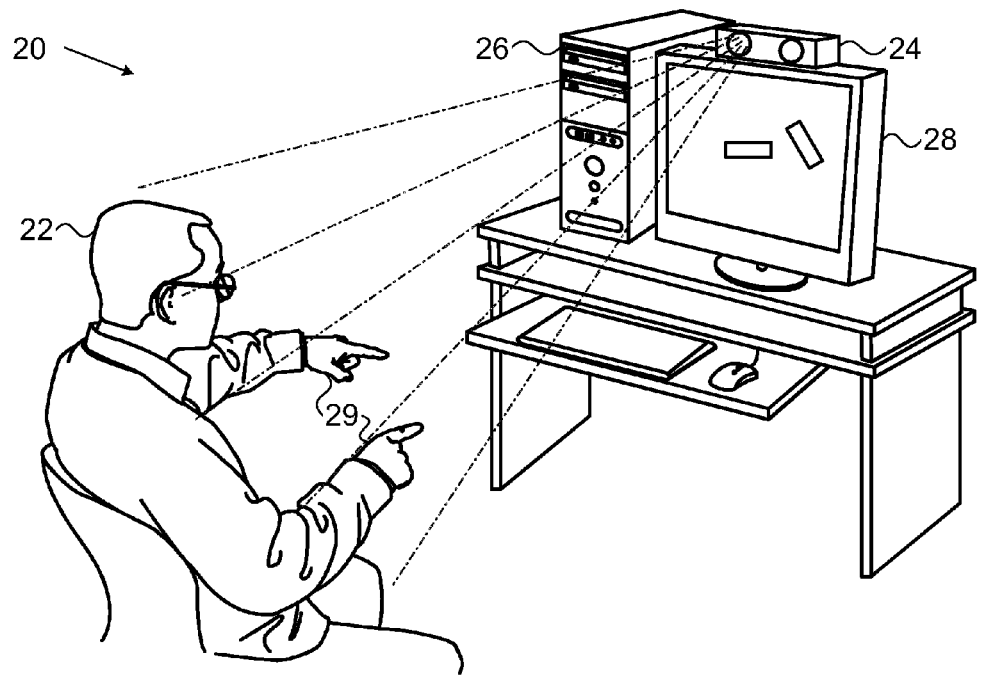
FIG. 1 is a schematic, pictorial illustration of a computer system executing a sessionless pointing user interface (SPUI), in accordance with an embodiment of the present invention.

FIG. 1 is a schematic, pictorial illustration of a sessionless pointing user interface (SPUI) 20 for operation by a user 22 of a computer 26, in accordance with an embodiment of the present invention. The SPUI is based on a 3D sensing device 24 coupled to the computer, which captures 3D scene information of a scene that includes the body (or at least a body part, such as hands 29) of the user. Device 24 or a separate camera (not shown in the figures) may also capture video images of the scene. The information captured by device 24 is processed by computer 26, which drives a display 28 accordingly.

Computer 26, executing SPUI 20, processes data generated by device 24 in order to reconstruct a 3D map of user 22. The term "3D map" refers to a set of 3D coordinates measured with reference to a fixed set of axes based on device 24. The 3D coordinates represent the surface of a given object, in this case the user's body. In one embodiment, device 24 projects a pattern of spots onto the object and captures an image of the projected pattern. Computer 26 then computes the 3D coordinates of points on the surface of the user's body by triangulation, based on transverse shifts of the spots in the pattern. Methods and devices for this sort of triangulation-based 3D mapping using a projected pattern are described, for example, in PCT International Publications WO 2007/043036, WO 2007/105205 and WO 2008/120217, whose disclosures are incorporated herein by reference. Alternatively, interface 20 may use other methods of 3D mapping, using single or multiple cameras or other types of sensors, as are known in the art.

In some configurations, sensing device 24 may include a microphone (not shown) configured to convey audio signals generated in response to speech or sound from user 22 to computer 26. Computer 26 can be configured to process the audio signals, thereby enabling the computer to respond to vocal commands from user 22, in addition to physical gestures performed by the user.

Computer 26 typically comprises a general-purpose computer processor, which is programmed in software to carry out the functions described hereinbelow. The software may be downloaded to the processor in electronic form, over a network, for example, or it may alternatively be provided on tangible media, such as optical, magnetic, or electronic memory media. Alternatively or additionally, some or all of the functions of the image processor may be implemented in dedicated hardware, such as a custom or semi-custom integrated circuit or a programmable digital signal processor (DSP). Although computer 26 is shown in FIG. 1, by way of example, as a separate unit from sensing device 24, some or all of the processing functions of the computer may be performed by suitable dedicated circuitry within the housing of the sensing device or otherwise associated with the sensing device.

As another alternative, these processing functions may be carried out by a suitable processor that is integrated with display 28 (in a television set, for example) or with any other suitable sort of computerized device, such as a game console or media player. The sensing functions of device 24 may likewise be integrated into the computer or other computerized apparatus that is to be controlled by the sensor output.

Various techniques may be used to reconstruct the 3D map of the body of user 22. In one embodiment, computer 26 extracts 3D connected components corresponding to the parts of the body from the depth data generated by device 24. Techniques that may be used for this purpose are described, for example, in U.S. patent application Ser. No. 12/854,187, filed Aug. 11, 2010, whose disclosure is incorporated herein by reference. The computer analyzes these extracted components in order to reconstruct a "skeleton" of the user's body, as described in the above-mentioned U.S. Patent Application Publication 2010/0034457, or in U.S. patent application Ser. No. 12/854,188, filed Aug. 11, 2010, whose disclosure is also incorporated herein by reference. In alternative embodiments, other techniques may be used to identify certain parts of the user's body, and there is no need for the entire body to be visible to device 24 or for the skeleton to be reconstructed, in whole or even in part.

Using the reconstructed skeleton, computer 26 can assume a position of a body part such as a tip of finger 30, even though the body part (e.g., the fingertip) may not be detected by the depth map due to issues such as minimal object size and reduced resolution at greater distances from device 24. In some embodiments, computer 26 can auto-complete a body part based on an expected shape of the human part from an earlier detection of the body part, or from tracking the body part along several (previously) received depth maps.

In some embodiments, the information generated by computer 26 as a result of this skeleton reconstruction includes the location and direction of the user's head, as well as of the arms, torso, and possibly legs, hands and other features, as well. Changes in these features from frame to frame (i.e. depth maps) or in postures of the user can provide an indication of gestures and other motions made by the user. User posture, gestures and other motions may provide a control input for user interaction with interface 20. These body motions may be combined with other interaction modalities that are sensed by device 24, including user eye movements, as described above, as well as voice commands and other sounds. Interface 20 thus enables user 22 to perform various remote control functions and to interact with applications, interfaces, video programs, images, games and other multimedia content appearing on display 28.

POINTING USER INTERFACE

Figure 2:
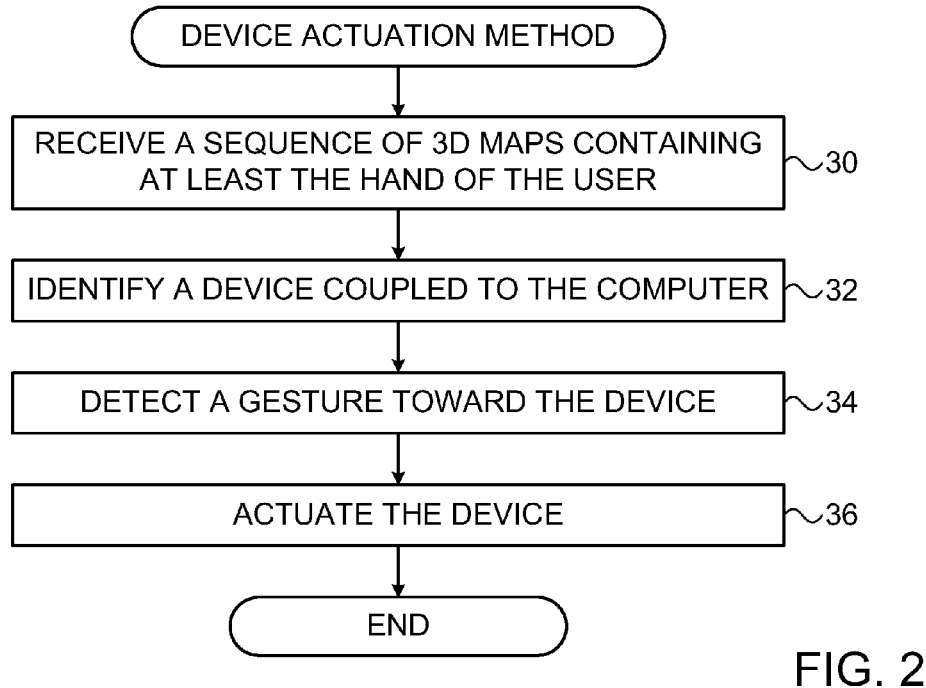
FIG. 2 is a flow diagram that schematically illustrates a method of using a gesture to actuate a device coupled to the computer, in accordance with an embodiment of the present invention.
Figure 3:
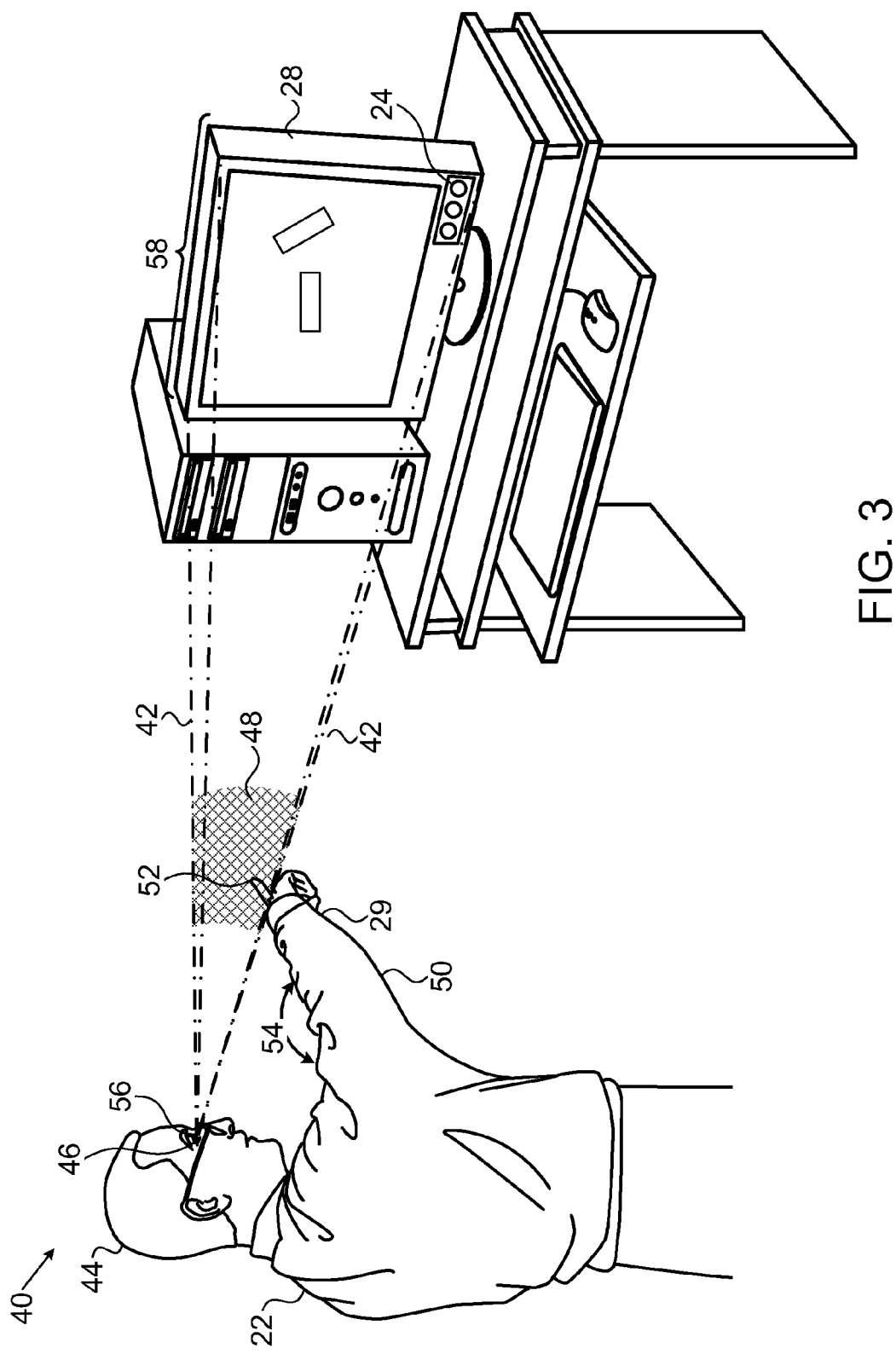
FIG. 3 is a schematic pictorial illustration of a first scene comprising a user interacting with the SPUI, in accordance with an embodiment of the present invention.

FIG. 2 is a flow diagram that schematically illustrates a method of actuating display 28, and FIG. 3 is a schematic pictorial illustration of a first scene 40 comprising user 22 interacting with computer 26, in accordance with an embodiment of the present invention. In the configuration shown in FIG. 3, 3D sensing device 24 and computer 26 are both integrated into display 28.

In a receive step 30, computer 26 receives, from sensing device 24, a sequence of 3D maps containing at least hand 29, and in an identification step 32, the computer identifies in the maps the hand and at least one device or entity coupled to, and driven by (i.e., controlled by), the computer. In the configuration shown in FIG. 3, the device comprises display 28 that incorporates sensing device 24. Therefore, computer 26 can interpret a gesture toward sensing device 24 as a gesture toward display 28.

In other configurations as described hereinbelow, computer 26 may control multiple devices in proximity to user 22.

Examples of devices that can be driven by computer 26 include, but are not limited to lamp fixtures, ventilation (i.e., heating/cooling) units, ceiling fans and electronic entertainment systems. If computer 26 is controlling multiple devices in proximity to user 22, then the user can identify the location of the devices during an initialization step. During the initialization step, computer 26 can identify devices in proximity to the sensing device (e.g., via Bluetooth or another communication protocol known in the art), present interactive items on display 28 corresponding to each of the identified devices, and direct the user to first point at a given one of the interactive items and then point to the corresponding device.

Upon identifying hand 29 and display 28, computer 26 can initialize sessionless pointing user interface (SPUI) 20 by defining a pyramid shaped region 42 within a field of view of 3D sensor 24. In the example shown in FIG. 3, pyramid shaped region 42 is rectangular and comprises an apex (i.e., the narrow tip) 56 that meets user 22, and a base (i.e., the wide end) 58 that encompasses display 28. In some embodiments, computer 26 positions apex 56 at a head 44 or an eyeball 46 of user 22.

In a detect step 34, computer 26 detects, in the sequence of 3D maps, a gesture directed toward display 28. Examples of gestures that user 22 can direct toward display 28 include, but are not limited to a grab gesture and pointing gestures. The grab gesture is described in U.S. patent application Ser. No. 13/423,314, filed on Mar. 19, 2012, whose disclosure is incorporated herein by reference, and comprises user 22 closing at least some fingers of hand 29.

Pointing gestures are described in PCT International Application PCT/IB2012/050577, filed Feb. 9, 2012, whose disclosure is incorporated herein by reference, and include a point-select, a point-touch, and a point-hold gesture. For example, to perform the point-touch gesture, user 22 points hand 29 toward display 28, stops or slows down the hand, and then pulls the hand back toward the user.

To reduce instances of false positives, computer 26 may be configured to define conditions for identifying a pointing gesture when analyzing the 3D maps. Examples of conditions include:

- Defining an interaction region 48 within pyramid shaped region 42, and identifying a pointing gesture upon the 3D maps indicating user 22 positioning hand 29 within region 48 and moving the hand toward the display.
- Defining an angle threshold (e.g., 90 degrees) for elbow 50, and identifying a pointing gesture upon the 3D maps indicating user 22 extending hand 29 toward the display and extending elbow 50 at an angle 54 greater than or equal to the angle threshold.
- Defining a minimum time period (e.g., 200 milliseconds), and identifying a pointing gesture upon the 3D maps indicating user 22 pausing hand 29 for the minimum time period after extending hand 29 toward the display. Requiring a minimum time period enables computer 26 to mimic the natural behavior of an individual pointing at an object.

In some embodiments, computer 26 may be configured to detect gestures performed by user 22 with fingers of hand 29, such as an index finger 52. Gestures performed by user 22 with hand 29 are referred to herein as hand gestures, and gestures performed with the fingers of the hand are referred to herein as finger gestures. Performing finger gestures can help reduce fatigue while interacting with computer 26. For example, rather than keeping hand 29 raised to perform a hand gesture, user 22 can keep the hand resting on a lap (i.e., while sitting), and perform gestures with the fingers of hand 29.

In some embodiments, computer 26 can be configured at either a higher resolution (also referred to herein as finger resolution) to detect the position (i.e., location and orientation) of individual fingers of hand 29, or a lower resolution (also referred to herein as hand resolution) to detect the position of hand 29. Additionally or alternatively, computer 26 may be configured to detect hand gestures and finger gestures at shorter distances between user 22 and 3D sensing device 24, and to detect hand gestures at longer distances between the user and the 3D sensing device. When configured for finger resolution, computer can respond to finger gestures such as a finger pointing gesture or a grab gesture.

Returning to the flow diagram, in an actuation step 36, computer 26 actuates the device to which the user is pointing, and the method ends. In the configuration shown in FIG. 3, computer 26 can actuate (i.e., turn on) display 28 in response to a pointing gesture performed by user 22. In alternative embodiments, computer 26 can present multiple interactive items (not shown) on display 28, identify a given interactive item to which the user is pointing, and actuate the identified interactive item. For example, computer 26 may present advertisements for multiple restaurants on display 28, and present detailed information on a given restaurant upon detecting a gesture directed toward the advertisement of the given restaurant.

In some embodiments, selecting a given interactive item comprises executing a software application associated with the given interactive item. In further embodiments the given interactive item is associated with a media item (e.g., a music track or a movie), and selecting a given interactive item comprises playing a media file associated with the given interactive item.

In operation, computer 26 can calculate a pointing geometry for any number of users 22 interacting with the computer. In embodiments where computer 26 is configured for hand resolution, the computer typically responds to a given user 22 performing a pointing gesture within pyramid shaped region 42. Therefore, if there is more than one user interacting with computer 26, then the computer can define a separate pyramid shaped region 42 for each of the users. In alternative embodiments wherein computer is configured for finger resolution, the computer can be configured to respond to pointing gestures performed by user 22 both inside and outside pyramid shaped region 42.

Figure 4:
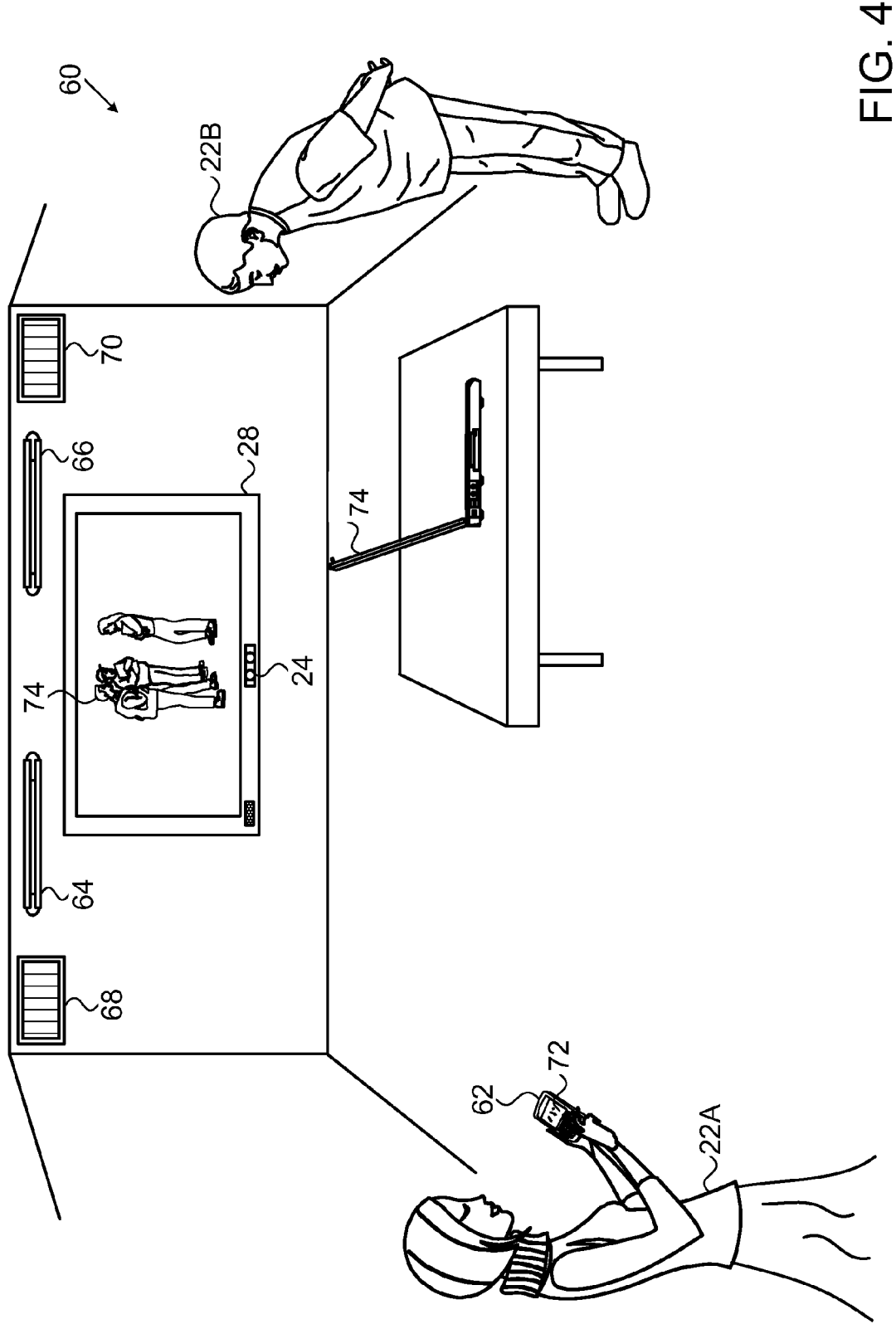
FIG. 4 is a schematic pictorial illustration of a second scene comprising multiple users interacting with the SPUI, in accordance with an embodiment of the present invention.

FIG. 4 is a schematic pictorial illustration of a second scene 60 (also referred to herein as room 60) comprising multiple users 22 interacting with computer 26, in accordance with an embodiment of the present invention. In the description of FIG. 4 herein, users 22 may be differentiated by appending a letter to the identifying numeral, so that the users comprise users 22A and 22B. As explained in detail hereinbelow, computer 26 can be configured to control display 28, lighting fixtures 64 and 66, and air vents 68 and 70.

Using gestures described herein, a given user 22 can individually control multiple devices configured to be driven by computer 26 (i.e., in addition to display 28). In one example, computer 26 can turn on (or off) a given one of the lighting fixtures in response to detecting, in the 3D maps, a pointing gesture directed toward the given lighting fixture.

In another example, computer 26 can open and close a given one of the air vents in response to detecting, in the 3D maps, a gesture directed toward the given air vent. To open the given air vent, user 22 can perform a release gesture toward the given air vent. The release gesture, described in U.S. patent application Ser. No. 13/423,314, filed on Mar. 19, 2012, whose disclosure is incorporated herein by reference, comprises user relaxing hand 29 so as to open the hand from a closed or folded state. Similarly, to close the given air vent the user can perform a grab gesture (as described supra) toward the given air vent.

While the configuration of scene 60 includes a single 3D sensing device 24, other configurations may include multiple 3D sensors, and are considered to be within the spirit and scope of the present invention. In some embodiments additional sensing devices 24 may be positioned in room 60, thereby enabling computer 26 to monitor the entire room (i.e., no blind spots) for gestures performed by the users. In alternative embodiments, the devices (e.g., the lighting fixtures and the air vents) may contain 3D sensors that are configured to communicate with computer 26.

In some embodiments, in addition to controlling multiple devices, a given user 22 can perform a pointing gesture to select one or more additional users in the user's vicinity. For example, user 22A can perform a first pointing gesture to select an icon on display 28 to start a multiplayer game, and then perform a subsequent pointing gesture directed toward user 22B user, thereby indicating user 22B as an additional participant in the game.

In additional embodiments, computer 26 can be configured to have the actuated device communicate with a further device in response to a subsequent gesture directed toward the further device. In a first example, user 22A wants to transfer a digital photograph 72 from a smartphone 62 to a photo album application 74 that computer 26 is presenting on display 28. Computer 26 can update photo album 74 upon detecting, in the 3D maps, user 22A performing an initial pointing gesture directed toward smartphone 62 and a subsequent pointing gesture directed toward display 28.

In a second example, computer 26 presents a web page on display 28, and user 22B wants to copy the uniform resource locator (URL) of the web page to a web browser application executing on a laptop computer 74. Computer 26 can copy the URL to the web browser application upon detecting, in the 3D maps, user 22B performing an initial pointing gesture directed toward display 28 and a subsequent pointing gesture directed toward laptop computer 74.

In a third example, user 22A wants to adjust the temperature in room 60. Computer 26 can present an air conditioning control menu (e.g., with icons for controlling settings such as temperature and fan speed) on display 28 in response to detecting, in the 3D maps, user 22A performing an initial pointing gesture directed toward one of the air vents and a subsequent pointing gesture directed toward display 28.

While the examples hereinabove describe using pointing gestures for multiple device interaction, other gestures are considered to be within the spirit and scope of the present invention. For example, computer 26 can copy the URL of the web page presented on display 28 to laptop computer 74 in response to detecting, in the 3D maps, user 22B performing a grab gesture directed toward display 28 and subsequent performing a release gesture directed toward laptop computer 74.

In scene 60, light fixture 64 is positioned in proximity to air vent 68, and light fixture 66 is positioned in proximity to air vent 70. In operation, if a given user 22 does not accurately "aim" a gesture toward an intended device, the computer may actuate a different device responsively to the gesture. For example, if user 22B intends to turn on light 66 but performs a pointing gesture toward air vent 70, computer 26 may turn on air vent 70 in response to the pointing gesture.

In some embodiments, computer 26 be configured to actuate a given device in response to a combination of a vocal (i.e., audio) command and a gesture. For example, to turn on lighting fixture 66, the user can say "Light" while pointing in proximity to lighting fixture 66. Combining vocal command processing with gesture recognition can enhance the accuracy of computer 26 controlling multiple devices in proximity to each other.

There may be instances user 22 performs a pointing gesture without intending to actuate a device controlled by computer 26. For example, user 22A can point toward user 22B during a conversation. To reduce the instances of false positives (i.e., unintentional pointing gestures), computer 26 can be configured to determine the intent of user 22 by detecting (and tracking), in the 3D maps, a gaze of the user, and actuating a given device in response to the gaze and a gesture directed toward the given device. In some embodiments tracking the gaze of the user comprises detecting an orientation of head 44 and/or eyeball 46.

For example, computer 26 can be configured to respond to a pointing gesture directed towards display 28 only if the 3D maps indicate that the user's gaze is directed toward the display. Identifying a gaze direction of user 22 is described in PCT International Application PCT/IB2012/050577, filed Feb. 9, 2012, whose disclosure is incorporated herein by reference.

It will be appreciated that the embodiments described above are cited by way of example, and that the present invention is not limited to what has been particularly shown and described hereinabove. Rather, the scope of the present invention includes both combinations and subcombinations of the various features, including the transformations and the manipulations, described hereinabove, as well as variations and modifications thereof which would occur to persons skilled in the art upon reading the foregoing description and which are not disclosed in the prior art.

We claim:

1. A method, comprising:
   identifying, by a computer coupled to a three-dimensional (3D) sensing device and a display, different, respective locations of multiple controllable devices other than the display;
   receiving, by the computer from the 3D sensing device, a sequence of three-dimensional maps containing at least a head and a hand of a user of the computer;
   detecting in the maps a gaze direction of the user that is directed toward a given device among the multiple controllable devices;
   defining a region in space with an apex at the head of the user and a base encompassing the given device;
   defining an interaction zone within the region;
   defining an angle threshold;
   defining a minimum time period;
   analyzing the maps to detect a gesture performed by the hand within the defined interaction zone that is directed toward an identified location of the given device among the multiple controllable devices,
   wherein the gesture comprises extending an elbow associated with the hand at an angle greater than or equal to the angle threshold, extending the hand toward the device and pausing the hand for the minimum time period; and
   actuating the given device responsively to the gesture.

2. The method according to claim 1, wherein the gesture is selected from a list comprising a pointing gesture, a grab gesture and a release gesture.

3. The method according to claim 1, and comprising receiving a vocal command from the user, and actuating the device in response to the gesture and the vocal command.

4. The method according to claim 1, and comprising communicating between the computer and a further device upon detecting, in the maps, a subsequent gesture directed toward the further device.

5. The method according to claim 1, wherein identifying the respective locations comprises performing, by the computer, an initialization step comprising:
   identifying, by the computer, the controllable devices that are in proximity to the 3D sensing device; and
   directing the user to point to each of the identified controllable devices.

6. An apparatus, comprising:
   a three-dimensional sensing device;
   a display; and
   a computer configured to identify different, respective locations of multiple controllable devices other than the display, to receive from the three-dimensional sensing device a sequence of three-dimensional maps containing at least a head and a hand of a user of the computer, to detect in the maps a gaze direction of the user that is directed toward a given device among the multiple controllable devices, to define a region in space with an apex at the head of the user and a base encompassing the given device, to define an interaction zone within the region, to analyze the maps to detect a gesture performed by the hand within the defined interaction zone that is directed toward an identified location of the given device among the multiple controllable devices, and to actuate the given device responsively to the gesture,
   wherein the computer is configured to define an angle threshold and a minimum time period, and wherein the gesture detected by the computer comprises extending an elbow associated with the hand at an angle greater than or equal to the angle threshold, extending the hand toward the given device, and pausing the hand for the minimum time period.

7. The apparatus according to claim 6, wherein the computer is configured to select the gesture from a list comprising a pointing gesture, a grab gesture and a release gesture.

8. The apparatus according to claim 6, wherein the computer is configured to receive a vocal command from the user, and to actuate the given device in response to the gesture and the vocal command.

9. The apparatus according to claim 6, wherein the computer is configured to communicate with a further device among the multiple controllable devices upon detecting, in the maps, a subsequent gesture directed toward the further device.

10. A computer software product comprising a non-transitory computer-readable medium, in which program instructions are stored, which instructions, when read by a computer executing a non-tactile user interface and coupled to a display, cause the computer to:
   identify different, respective locations of multiple controllable devices other than the display,
   receive from a three-dimensional sensing device that is coupled to the computer a sequence of three-dimensional maps containing at least a head and a hand of a user of the computer,
   detect in the maps a gaze direction of the user that is directed toward a given device among the multiple controllable devices,
   define a region in space with an apex at the head of the user and a base encompassing the given device,
   define an interaction zone within the region,
   analyze the maps to detect a gesture performed by the hand within the defined interaction zone that is directed toward an identified location of the given device among the multiple controllable devices, and
   actuate the given device responsively to the gesture,
   wherein the instructions cause the computer to define an angle threshold and a minimum time period, and wherein the gesture detected by the computer comprises extending an elbow associated with the hand at an angle greater than or equal to the angle threshold, extending the hand toward the given device, and pausing the hand for the minimum time period.

* * * * *